(12) United States Patent
Brandwood et al.

(10) Patent No.: US 7,830,308 B2
(45) Date of Patent: Nov. 9, 2010

(54) APPARATUS FOR MULTILATERATION AND METHOD

(75) Inventors: David Herbert Brandwood, Hampshire (GB); Timothy John Quilter, Salisbury (GB)

(73) Assignee: Roke Manor Research Limited, Romsey (GB)

( * ) Notice: Subject to any disclaimer, the term of this patent is extended or adjusted under 35 U.S.C. 154(b) by 194 days.

(21) Appl. No.: 11/802,551

(22) Filed: May 23, 2007

(65) Prior Publication Data

US 2008/0042902 A1    Feb. 21, 2008

(30) Foreign Application Priority Data

Jul. 3, 2006 (GB) .................................. 0613083.5

(51) Int. Cl.
*G01S 5/12* (2006.01)
(52) U.S. Cl. ...................... 342/465; 342/450
(58) Field of Classification Search .............. 342/450, 342/465
See application file for complete search history.

(56) References Cited

U.S. PATENT DOCUMENTS

| | | | | |
|---|---|---|---|---|
| 5,890,068 A | * | 3/1999 | Fattouche et al. | ........ 455/456.2 |
| 5,999,116 A | | 12/1999 | Evers | |
| 6,064,885 A | * | 5/2000 | Rouhollahzadeh et al. | .. 455/439 |
| 6,191,737 B1 | | 2/2001 | Havinis et al. | |
| 6,901,264 B2 | * | 5/2005 | Myr | ......................... 455/456.5 |
| 6,952,181 B2 | * | 10/2005 | Karr et al. | .................... 342/457 |
| 6,985,731 B1 | * | 1/2006 | Johnson et al. | ............. 455/436 |
| 6,999,780 B1 | * | 2/2006 | Zhao | ........................ 455/456.5 |
| 7,277,712 B2 | * | 10/2007 | Burke | ....................... 455/456.1 |
| 7,440,762 B2 | * | 10/2008 | Maloney et al. | .......... 455/456.1 |
| 7,474,265 B1 | * | 1/2009 | Small | .......................... 342/464 |

FOREIGN PATENT DOCUMENTS

GB    2 250 154 A    5/1992
WO    WO 2005/119288 A2    12/2005

OTHER PUBLICATIONS

European Search Report dated Oct. 23, 2007 (Six (6) pages).

* cited by examiner

*Primary Examiner*—Thomas H Tarcza
*Assistant Examiner*—Cassi Galt
(74) *Attorney, Agent, or Firm*—Crowell & Moring LLP

(57) ABSTRACT

To cater for the positioning of an aircraft in a boundary zone between two adjacent multilateration systems, the controller (14) in one system receives Time Difference of Arrival data provided by the controller (15) in the second system. The controller (15) derives the TDoA data from time of arrival data provided by its receiver stations (9-13). By furnishing TDoA data the timings of the two systems do not need to be synchronised. The controller (14) uses the TDoA data and also time of arrival data from its local receiver stations (4-8) to perform a multilateration to determine the location of the aircraft (16).

2 Claims, 2 Drawing Sheets

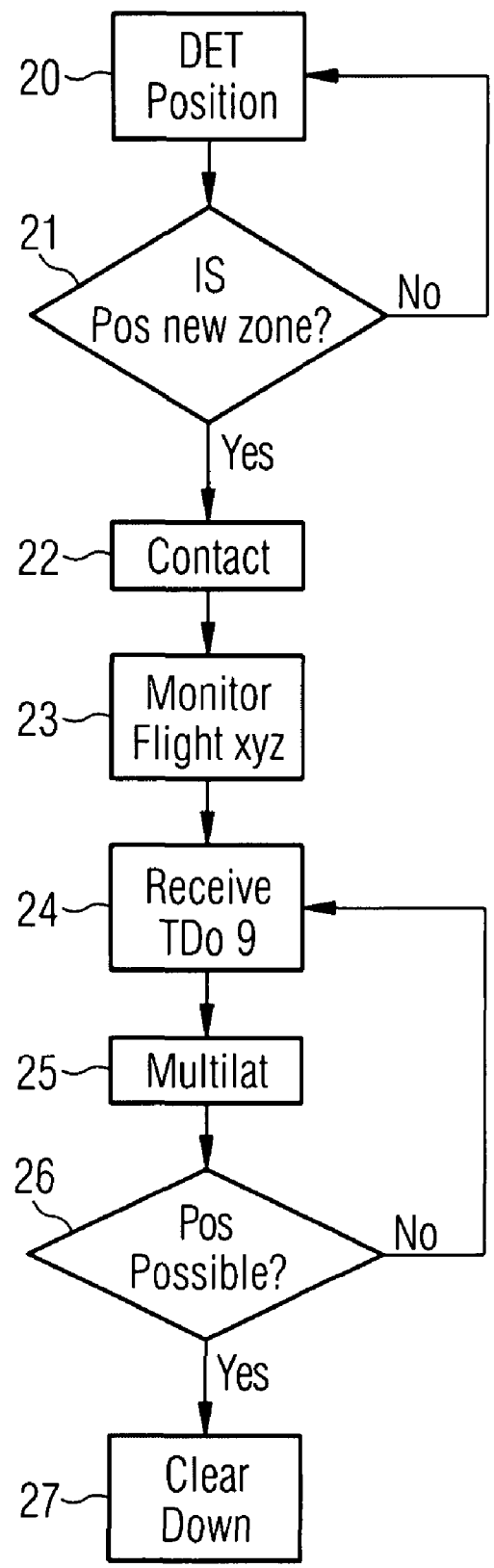

APPARATUS FOR MULTILATERATION AND METHOD

This invention relates to an apparatus and method for multilateration of an object's position.

BACKGROUND OF THE INVENTION

Multilateration is a process by which an object's location can be fixed from a radio transmission made from the object and received at a number of receiver station stations. The time of arrival at the receiver stations is noted and passed to a central processing unit where, with knowledge of the position of the receiver stations, the position of the object is determined. Alternatively, the signals are passed over a link to the central processing unit which determines the time of arrival at the receiver station with reference to the delay caused by the link. A process of signal correlation is carried out in the central controller in which the received signals are compared with a copy of the transmitted signal.

Multilateration systems are used, in particular, to provide the position of aircraft in flight or on airport runways. A signal transmitted by a transmitter on the aircraft is received by a number of receiver stations at known locations on the ground. The signal is transmitted by a 1090 MHz Secondary Surveillance Radar (SSR) transponder and is one of a number of known code types or formats such as Mode A/C and Mode S. By measuring the time of arrival of the signal at each of the receiver stations (or deriving it as mentioned above), and with the knowledge of their locations, it is possible to calculate the position of the aircraft at the time of transmission. Such a system and a multilateration technique is described in patent GB2250154, the contents of which are incorporated herein by reference.

SUMMARY OF THE INVENTION

The present invention arose from a realisation by the inventor that there is a discontinuity in the coverage between two or more adjacently located multilateration systems which can be alleviated or eliminated by exchanging time difference of arrival data between the systems for a signal received from the object at the receiver stations of the two systems.

Accordingly, the invention provides a method and, in a preferred aspect, a multilateration system, in which a controller receives from a first set of receiving stations data concerning arrival of a signal transmitted from an object to be positioned, and receives time difference of arrival data derived from a second set of receiver stations which receive the signal from the object. The controller performs a multilateration process on the data to determine the location of the object.

By receiving time difference of arrival data from the second set of receiver stations and utilising that data, the effect of the second set of receiver stations not being time synchronous with a high level of accuracy with the first is eliminated or at least greatly alleviated. This would not be the case if the time of arrival data were to be processed. Thus, by employing the invention, data originating from different sets of receiver stations may be utilised without the need for all the sets to be synchronised. The invention thus permits the use of data from two or more distinct multilateration systems each of which may consist of different manufacturer's equipment. This can typically occur, as described in the specific embodiment, at the boundaries of flight control zones or countries.

The data from the first set of receiver stations may be time of arrival or time difference of arrival data.

In a first embodiment of the invention, the time difference of arrival data from the second set of receiver stations is sent to the controller without the need to make a request. In an alternative embodiment the data is sent after a request is made for the data. That request may be for data from all receiving stations in the second set or it may specify which receiving stations should provide data.

The stations to be used to provide the positioning data may be determined as an object enters a particular zone or it may be done in with a reference to a predicted path.

Preferably, the time difference of arrival data is derived, based on the time of arrival of a signal received at the second set of receiver stations, by a second controller which second controller communicates the time difference of arrival data to the controller, via a communication link.

In the specific embodiment, data is exchanged between two multilateration systems to determine an aircraft's position. Various groupings of receiver stations may be arranged between the two systems to position the aircraft in two or three dimensions for various locations of the aircraft. Each system has a controller and the two controllers may interact together to exchange the data or may interact with a further controller or controller. Any of the controllers may perform the multilateration process on the exchanged data.

BRIEF DESCRIPTION OF THE DRAWINGS

A specific embodiment of the invention will now be described, by way of example only, with reference to and as illustrated by the drawing in which:

FIG. 2 is an explanatory diagram showing method steps carried out by the controller of FIG. 1.

DETAILED DESCRIPTION OF THE INVENTION

Figure 1:
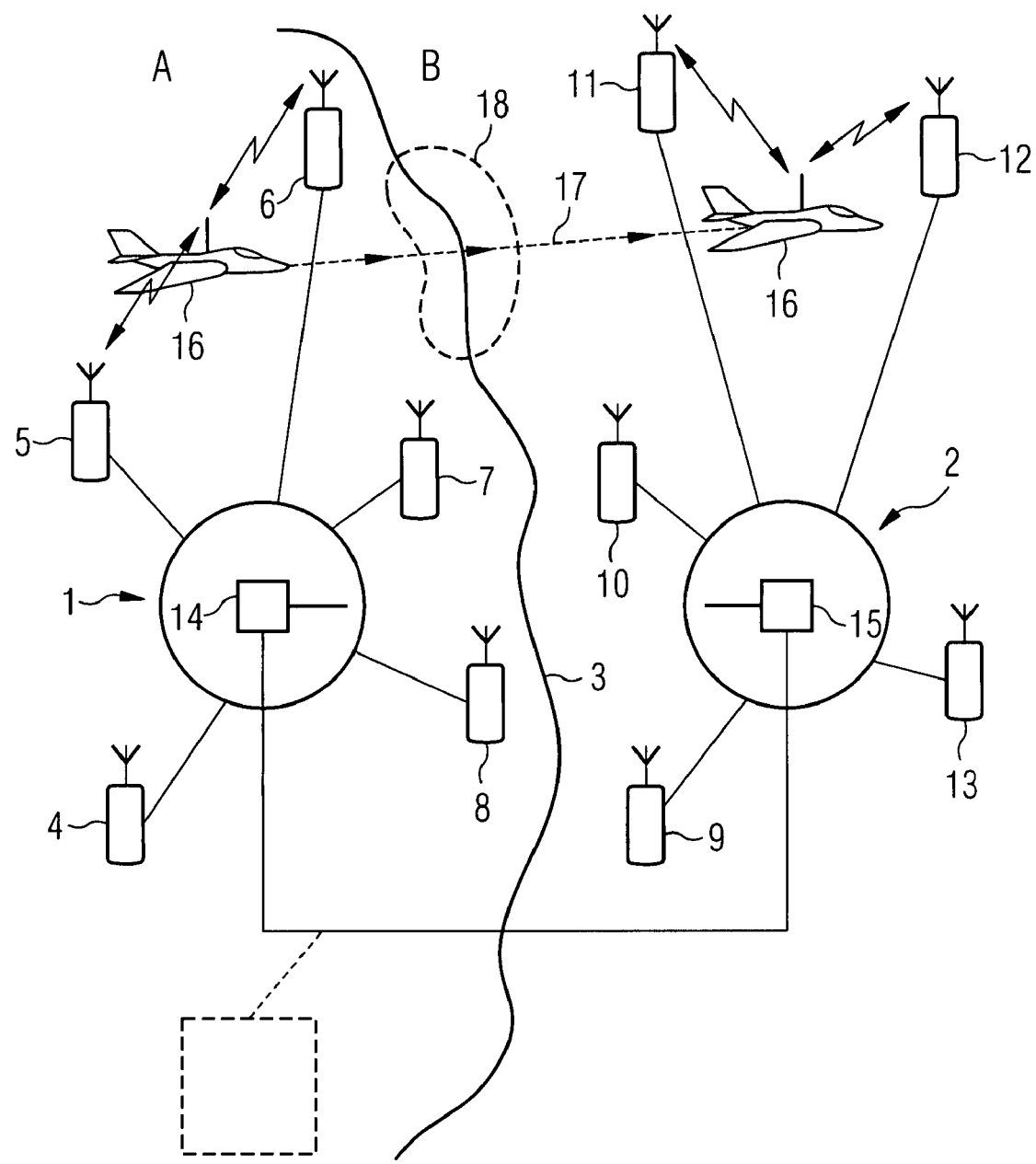
FIG. 1 is a schematic block diagram which shows two multilateration systems in two neighbouring countries, the controller of the first system operating in accordance with the invention.

As is shown in FIG. 1, two multilateration systems 1 and 2 are provided to cover two neighbouring countries A and B having a national border 3. Each of the multilateration systems 1, 2 comprises a plurality of receiver stations 4 to 8 and 9 to 13 providing signal time of arrival data to respective controllers 14 and 15 via respective wide area networks. The signal is a mode A SSR signal (although it may be another signal type such as Mode C or Mode S) and is transmitted from an object to be located which in this case is an aircraft 16. The controllers perform a multilateration process using the time of arrival of the signal information provided by the receiver stations and known positions of the receiver stations. Such a process will be well known to a person skilled in the art and is described, for example, in GB2250154 A. Thus, system 1 is able to locate the aircraft within the zone of coverage of the receiver stations 4 to 8 and system 2 is able to locate it within the zone of coverage of receiver stations 9 to 13.

A problem occurs, however, as the aircraft 16 follows a flight path 17. For as it travels, from the zone of coverage of the first system 1, into the zone of coverage of zone 2, the aircraft 16 passes through a zone 18 where the coverage of either system is not ideal. For simplicity, this zone 18 is shown centred on the border 3, although it will be appreciated that a real situation will be more complex and dependent to a great part on receiver station location and the local topography. This means that by using prior art methods the aircraft 16 may not be positioned with sufficient accuracy within zone 18 for safety. This may be addressed by ensuring that the allowed flight paths within the zone 18 have sufficient separation to ensure safe operation but this, of course, will lead to under-utilisation of the airspace.

In a first embodiment of the invention, data is carried between the two systems along a link 19 in a constant manner. The data derived from the signal received by the receiver stations is transferred over the link 19. Each controller provides to the other time difference of arrival data for its receiver stations. Thus controller 15 derives time difference of arrival data for receiver stations 10 and 11 and transmits it over the link 19 to controller 14. Controller 14 derives time difference of arrival data for receiver stations 6 and 7 and transmits it to controller 15 over the link 19.

Each controller will then perform a multilateration using the time difference of arrival data of the other controller together with the time of arrival data provided by its receiver stations. For example, controller 14 uses the time of arrival data from receiver stations 6, 7 and 8 together with the time difference of arrival data from receiver stations 10 and 11. In utilising the time difference of arrival data, the controller is mitigating the potential difference in the system timings of the systems because a difference is involved. That is to say, system 1 and 2 may not be synchronised with the required accuracy. However, the time of arrival data is not utilised which would require a high degree of synchronisation but the time difference of arrival data is exchanged. This system could also be used to perform a multilateration with time difference of arrival data from both system 1 and system 2. In other words, controller 14 utilises time difference of arrival data received from controller 15 together with time difference of arrival data it derives from its own receiver stations 6 and 7.

In a second embodiment, which will be explained with the same figure, the controllers co-operate by one requesting of the other time difference of arrival data from the other when the aircraft is determined by one of the controllers to be heading for or entering a zone of poor coverage.

For example, as the controller 14 determines that the aircraft 16 is approaching the zone 18, it assumes a role as master controller. The master controller then contacts the controller 15 of the adjacent system 2 and requests time difference of arrival data for receipt of the signals transmitted by the aircraft 16 and received by the receiver stations 9 to 13 of the system 2. It should be noted here that the data is the time difference of arrival and not the time of arrival. The advantage of doing this is that the differences between the different system times can then be eliminated because the process relies upon the time difference not the absolute system time. The master controller then performs a multilateration utilising time of arrival data from its own receiver stations and time difference of arrival data from the other system. It should be noted that this may involve particular groupings of the receiver stations from both systems to be formed or the use of all of the stations. (In alternative embodiments it may be more convenient to use time difference of arrival data from both systems.)

As the aircraft 16 continues on its flight path it enters the zone of coverage of system 2. When the controller 15 determines this, it signals the master controller 14 that it has the aircraft located with the required level of precision and the information interchange ceases.

It will be appreciated that the role of master controller may be adopted by either controller dependent upon the flight direction of the aircraft. In addition, with a number of aircraft in the airspace the role of master may be adopted by both controllers at the same time but for different aircraft or both controllers may have an equal status.

The method will now be described with reference to FIG. 2. In a first step 20, the aircraft 16 position is determined by the controller 14 utilising its receiver stations 4 to 8. In the next step 21, it is determined whether or not the aircraft 16 is approaching the zone 18 by comparing the position with a map locating the zone held in memory. If the answer is no then the process returns to step 20. If the zone 18 is being approached, then the next step is step 22.

In step 22, the controller 14 adopts the role of a master controller and performs a handshaking routine with the other controller 15 over the communication link 19. When communication has been established, the controller 14 transmits a message indicating the signal to be monitored in step 23. This will include the mode A flight identifier. The controller 15 then requests its receiving stations to monitor for signals from this flight, that is to say, signals being transmitted from aircraft 16. The receiver stations 9 to 13 (although only some may be required) return the time of arrival data for the signals to the controller 15. It then generates the Time Difference of Arrival (TDoA) values and transmits them over the communication link 19 to be received by the master controller 14 in step 24.

In the next step 25, the controller 14 utilises the TDoA from system 2 with the time of arrival data from the receiver stations of its own system to perform a multilateration on the aircraft 16 to determine its position.

As the aircraft 16 travels onwards, in step 26 the controller 15 checks whether or not it can perform a full multilateration. When it can it sends a positioning possible message to the controller 14 over the communication link. This triggers the last step 27 in which the use of the two sets of receiver stations to monitor zone 18 is ceased with controller 14 sending a clear down message to controller 15. Controller 15 then stops sending TDoA data over the link 19.

In a yet further embodiment of the invention, a third controller shown in broken outline may be connected to the link 19 to accept time difference of arrival data from one of the systems 1 or 2 and time of arrival or time difference of arrival from the other.

It will be appreciated that a multilateration system can usefully position an aircraft or other object in two or three dimensions. For a two dimension solution in the zone 18 it will be possible to achieve this using time of arrival data from receiver station stations 6, 7 and 10, 11. Further receiver stations, such as receiver station 8 could be used to perform a three dimension multilateration.

The controllers depending on the embodiment will include transmitter and or receiver to utilise the communication link. A range of protocols could be used in the transmission and reception of the data that will be readily apparent to the person skilled in the art.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A system for determining the position of an aircraft, comprising:
   a multilateration system controller;
   a plurality of receiving stations for receiving an identifying signal from an object that is to be located within a zone of coverage of said multilateration system, said receiving stations being coupled in communication with said controller and sending to said controller time of arrival data for said identifying signal; wherein;

said multilateration system controller has an input for receiving information from a second controller which is part of an adjacent multilateration system;

when said object is in proximity to a boundary between said zone of coverage of said multilateration system and a zone of coverage of said adjacent multilateration system, said first controller uses said time of arrival information received from said receiving stations, together with said information received from said second controller, to determine the position of said object; and said information received from said second controller is time difference of arrival data determined based on information received by said second controller concerning arrival of said identifying signal at respective receiving stations of said adjacent multilateration system.

2. A method for determining the position of an aircraft that is within a zone of coverage of a first multilateration system having a plurality of receiving stations for receiving an identifying signal from said object, and sending time of arrival information regarding said identifying signal to a controller of said first multilateration system for position determination, said method comprising:

when said object is in a portion of said zone of coverage of said first multilateration system that is in proximity to a zone of coverage of an adjacent multilateration system, said controller of said first multilateration system receiving from a controller of said adjacent multilateration system time difference of arrival data for said identifying signal at receiving stations of said adjacent multilateration system;

said controller of said first multilateration system determining the position of said object based on said time of arrival information of said first multilateration system and said time difference of arrival information of said second multilateration system.

* * * * *